(12) United States Patent
Bai et al.

(10) Patent No.: US 10,997,799 B2
(45) Date of Patent: May 4, 2021

(54) METHOD AND APPARATUS FOR LEVERAGING WIRELESS CONNECTIVITY FOR PRE-SERVICE PREPARATION IN SERVICE LANES

(71) Applicant: GM GLOBAL TECHNOLOGY OPERATIONS LLC, Detroit, MI (US)

(72) Inventors: Fan Bai, Ann Arbor, MI (US); Lakshmi V. Thanayankizil, Rochester Hills, MI (US); John Sergakis, Bloomfield, MI (US); Matthew Alan Schroeder, Plymouth, MI (US); Kathleen S. McMahon, West Bloomfield, MI (US); Xi Ju, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 124 days.

(21) Appl. No.: 16/400,265

(22) Filed: May 1, 2019

(65) Prior Publication Data

US 2020/0349777 A1    Nov. 5, 2020

(51) Int. Cl.
| | |
|---|---|
| *H04L 29/00* | (2006.01) |
| *G07C 5/00* | (2006.01) |
| *G07C 5/08* | (2006.01) |
| *H04L 9/06* | (2006.01) |
| *H04W 76/10* | (2018.01) |
| *H04L 9/08* | (2006.01) |
| *H04W 12/03* | (2021.01) |

(52) U.S. Cl.
CPC .............. *G07C 5/008* (2013.01); *G07C 5/006* (2013.01); *G07C 5/0808* (2013.01); *H04L 9/0643* (2013.01); *H04L 9/088* (2013.01); *H04W 12/03* (2021.01); *H04W 76/10* (2018.02)

(58) Field of Classification Search
CPC .............. B61L 2027/005; G07C 5/008; G07C 2205/02; G07C 5/006; G07C 5/0808; G08G 1/20; G08G 1/093; G08G 1/017; H04W 76/10; H04W 12/03; H04L 9/0643; H04L 9/088
See application file for complete search history.

(56) References Cited

FOREIGN PATENT DOCUMENTS

| | | | |
|---|---|---|---|
| JP | 2002109690 | * | 2/2002 |
| JP | 2006004180 | * | 1/2006 |

* cited by examiner

*Primary Examiner* — Ghazal B Shehni
(74) *Attorney, Agent, or Firm* — Lorenz & Kopf, LLP (57) ABSTRACT

A computer-implemented method at a service facility for capturing vehicle state and service information (VSSI) is provided. The method includes: detecting the arrival of a vehicle at the service facility; initiating, by a processor at the service facility, the establishment of a secure communication link with the vehicle via an in-vehicle wi-fi hotspot; wirelessly retrieving, by the processor at the service facility from the vehicle, a subset of VSSI via the wi-fi hotspot, wherein the retrieved VSSI includes the subset of the VSSI that has changed since the last update of the VSSI to a cloud-based server and wherein the subset of the VSSI includes some, but not all of the VSSI; and scheduling a vehicle service based on service indications derived from the VSSI.

20 Claims, 8 Drawing Sheets

METHOD AND APPARATUS FOR LEVERAGING WIRELESS CONNECTIVITY FOR PRE-SERVICE PREPARATION IN SERVICE LANES

TECHNICAL FIELD

The technology described in this patent document relates generally to systems and methods for accessing vehicle state and service information, and more particularly to systems and methods for wirelessly accessing vehicle state and service information.

Modern vehicles (e.g., automobile, car, light truck, and others) employ various embedded electronic controllers that improve the performance, comfort, safety, etc. of the vehicle. Such controllers include engine controllers, suspension controllers, steering controllers, power train controllers, climate control controllers, infotainment system controllers, chassis system controllers, etc. These controllers communicate over in-vehicle networks such as a controller area network (CAN). Modern vehicles also possess self-diagnostic and reporting capabilities via an on-board diagnostic (OBD) system. Vehicle state and service information (VSSI) can be captured by the OBD system in the vehicle, and the VSSI can be used by a vehicle owner or repair technician to identify vehicle service needs. The VSSI may include a diagnostic trouble code (DTC) which can be used to diagnose the cause of a specific problem the vehicle is experiencing. The VSSI may include information identifying preventive services that are due for the vehicle, such as an oil change or other fluid change. The VSSI may include other information that can be useful for determining vehicle service needs. Presently, a service technician can physically connect a diagnostic tool to the vehicle's diagnostic link connector (DLC) to obtain VSSI such as DTCs. A reliable way for obtaining VSSI without physically connecting to the vehicle, however, is not available.

Accordingly, it is desirable to provide a system and method for obtaining VSSI without physically connecting to the vehicle. Furthermore, other desirable features and characteristics of the present invention will become apparent from the subsequent detailed description of the invention and the appended claims, taken in conjunction with the accompanying drawings and the background of the invention.

SUMMARY

Systems and methods for accessing vehicle state and service information (VSSI) are provided. In one embodiment, a computer-implemented method at a service facility for capturing vehicle state and service information (VSSI) is provided. The method includes: detecting the arrival of a vehicle at the service facility; initiating, by a processor at the service facility, the establishment of a secure communication link with the vehicle via an in-vehicle wi-fi hotspot; wirelessly retrieving, by the processor at the service facility from the vehicle, a subset of VSSI via the wi-fi hotspot, wherein the retrieved VSSI includes the subset of the VSSI that has changed since the last update of the VSSI to a cloud-based server and wherein the subset of the VSSI includes some, but not all of the VSSI; and scheduling a vehicle service based on service indications derived from the VSSI.

In one embodiment, the initiating the establishment of a secure communication link with the vehicle includes: wirelessly transmitting a pairing request to the vehicle; receiving a first message from the cloud-based server containing a vehicle private key via a backbone network; receiving a second message from the vehicle containing a code word that has been encrypted by the vehicle using a service facility private key; decrypting the code word using the service facility private key; re-encrypting the decrypted code word using the vehicle private key; and transmitting the re-encrypted code word to the vehicle; wherein the secure communication link is established after the vehicle decrypts the re-encrypted code word and verifies that the decrypted re-encrypted code word is the same as the code word that was encrypted by the vehicle and received by the service facility in the second message.

In one embodiment, the wirelessly retrieving the subset of the VSSI includes retrieving, from the vehicle, data for determining the subset of the VSSI that has changed since the last update of the VSSI to the cloud-based server.

In one embodiment, the retrieving data for determining the subset of the VSSI that has changed since the last update of the VSSI to the cloud-based server includes: receiving from the vehicle the results from applying a hash function to the VSSI; and sending the hash function results to the cloud-based server for use in performing a membership test.

In one embodiment, the applying a hash function to the VSSI includes applying a bloom filter to the VSSI, and the sending the hash function results to the cloud-based server includes sending the bloom filter results to the cloud-based server for use in performing a membership test.

In one embodiment, the wirelessly retrieving the subset of the VSSI further includes: receiving, from the cloud-based server, a request for a subset of the VSSI that failed a membership test performed by the cloud-based server on cloud-based server stored VSSI; requesting, from the vehicle, the subset of the VSSI that failed the membership test; receiving, from the vehicle, the subset of the VSSI that failed the membership test; and sending the received subset of the VSSI that failed the membership test to the cloud-based server.

In one embodiment, the scheduling a vehicle service based on service indications derived from the VSSI includes identifying automotive service needs from the VSSI.

In one embodiment, the identifying automotive service needs from the VSSI includes: receiving, from the cloud-based server, service indications determined by cloud-based server analysis of the VSSI; or receiving, from the cloud-based server, VSSI for analysis by the service facility to determine maintenance indications.

In another embodiment, a computer-implemented method in a vehicle for facilitating automatic scheduling of an automotive service by a service facility is provided. The method includes: establishing, by a processor in the vehicle, a secured communication link with the service facility via an in-vehicle wi-fi hotspot responsive to a connection request from the service facility; and securely transmitting a subset of the vehicle state and service information (VSSI) via the secured communication link, wherein the transmitted VSSI includes the subset of the VSSI that has changed since the last update of the VSSI to a cloud-based server, and wherein the subset of the VSSI includes some, but not all of the VSSI; wherein a vehicle service is automatically scheduled by the service facility based on maintenance indications derived from the VSSI without user request for service.

In one embodiment, the establishing a secured communication link with the service facility includes: receiving a wirelessly transmitted pairing request from the service facility wherein the pairing request includes a service facility identifier; transmitting a request, which includes the service facility identifier, to the cloud-based server to authenticate the service facility; receiving a first message from the cloud-based server containing a service facility private key after the cloud-based server has authenticated the service facility; encrypting a first code word using the service facility private key; sending a first encrypted message containing the encrypted first code word to the service facility via an in-vehicle wi-fi hotspot; receiving a second message from the service facility containing an encrypted second code word; decrypting the encrypted second code word using a vehicle private key; determining if the decrypted second code word is the same as the first code word; and establishing secure communication with the service facility when the vehicle verifies that the decrypted second code word is the same as the first code word.

In one embodiment, securely transmitting a subset of the VSSI includes: securely transmitting VSSI metadata to the cloud-based server via a cellular network; and securely transmitting results from the application of a Bloom filter to the VSSI to the service facility via the secured communication link.

In one embodiment, the VSSI metadata includes the identity of a hash function and bloom filter parameters.

In one embodiment, securely transmitting a subset of the VSSI includes securely transmitting the subset of VSSI requested by the service facility.

In another embodiment, a computer-implemented method in a cloud-based server for facilitating automatic scheduling of an automotive service for a vehicle by a service facility is provided. The method includes: providing security credentials to the vehicle and the service facility to facilitate secured communications between the service facility and the vehicle; storing VSSI for the vehicle in a data store; performing a membership test on the stored VSSI to determine if a subset of the VSSI is stale; requesting that the service facility obtain from the vehicle a subset of current VSSI to replace the subset of VSSI that is stale; receiving the subset of current VSSI from the service facility; and alerting the service facility of vehicle service needs based on analysis of VSSI or providing a subset of VSSI that identifies vehicle service needs; wherein the service facility can automatically schedule an automotive service based on the service needs derived from the VSSI without user request for service.

In one embodiment, the providing security credentials to the vehicle and the service facility to facilitate secured communications includes: receiving a request from the vehicle that includes a service facility identifier to validate the service facility via a cellular network; validating the service facility using the service facility identifier; sending encryption credentials to the vehicle via the cellular network and the service facility via a backbone network for use in secured communication between the vehicle and the service facility.

In one embodiment, the sending encryption credentials to the vehicle and the service facility includes: sending a service facility private key to the vehicle via the cellular network; and sending a vehicle private key to the service facility via the backbone network.

In one embodiment, performing a membership test on the stored VSSI to determine if a subset of the VSSI is stale includes: receiving VSSI metadata from the vehicle via the cellular network; and receiving, from the service facility, data for determining the subset of the VSSI that has changed since the last update of the VSSI to the cloud-based server via the backbone network.

In one embodiment, the VSSI metadata includes a hash function and bloom filter parameters.

In one embodiment, the receiving data for determining the subset of the VSSI that has changed since the last update of the VSSI to the cloud-based server includes receiving, from the service facility, the results from applying a hash function to the VSSI.

In one embodiment, the applying a hash function to the VSSI includes applying a bloom filter to the results from the application of the hash function to the VSSI; and the receiving the results from applying a hash function to the VSSI includes receiving the bloom filter results from the service facility.

In one embodiment, performing a membership test on the stored VSSI to determine if a subset of the VSSI is stale further includes performing a membership test using the bloom filter data.

In another embodiment, a computer-implemented method in a system for facilitating automatic scheduling of an automotive service for a vehicle by a service facility is provided. The method includes: transmitting, by a processor at a service facility, a pairing request containing a dealer signature to a vehicle upon detection by the service facility of vehicle approach; responsive to the pairing request, transmitting, by the vehicle, a request to a cloud-based server to verify the service facility; validating the service facility by the cloud-based server; generating, by the cloud-based server, security credentials for the vehicle and the service facility for secured communications between the service facility and the vehicle; transmitting, by the cloud-based server, a first message to the vehicle with a service facility private key via the cellular network; transmitting, by the cloud-based server, a second message to the service facility with a vehicle private key via a backbone network; generating, by the vehicle, a code word; encrypting the code word, by the vehicle, using the service facility private key, and transmitting, by the vehicle, a third message containing the encrypted code word to the service facility via an in-vehicle wi-fi network; decrypting, by the service facility, the encrypted code word from the third message using the service facility private key; encrypting, by the service facility, the decrypted code work using the vehicle private key; transmitting, by the service facility, the re-encrypted code word in a fourth message to the vehicle; decrypting, by the vehicle, the encrypted code word in the fourth message using the vehicle private key; determining, by the vehicle, that a challenge and response sequence has been validated by determining whether the decrypted code word from the fourth message equals the unencrypted code word from the third message; and using the security credentials provided by the cloud-based server for secured communication between the vehicle and the service facility when the challenge response sequence has been validated.

In one embodiment, the method further includes: after successful pairing, sending, by the vehicle, results from applying a Bloom filter to VSSI to the service facility; sending, by the service facility, the results to the cloud-based server for membership test performance; performing, by the cloud-based server, a membership test on cloud-saved VSSI; when the cloud-based server determines from the membership test that a subset of the cloud-saved VSSI is stale: (i) transmitting, by the cloud-based server, a request to the service facility to obtain a subset of current VSSI; (ii) requesting, by the service facility, the subset of current VSSI from vehicle; (iii) transmitting by the vehicle the requested subset of current VSSI to the service facility; (iv)transmitting by the service facility the subset of current VSSI to the cloud-based server; (v) and transmitting by the cloud-based server to the service facility vehicle service needs information derived from the VSSI; and when the cloud-based server determines from the membership test that a subset of the cloud-saved VSSI is not stale, transmitting, by the cloud-based server to the service facility, service needs information derived from the VSSI.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, network communications and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for allowing access to vehicle state and service information (VSSI) without making a physical connection to the vehicle. An authorized service facility, such as an authorized dealership, can make use of the apparatus, systems, techniques and articles described herein to expedite vehicle servicing. The apparatus, systems, techniques and articles described herein can allow an authorized service facility to obtain VSSI before having physical access to the vehicle. This can allow for increased service facility productivity and can lead to reductions in an OEM's cost structure. The apparatus, systems, techniques and articles described herein can allow an authorized service facility to obtain VSSI when a vehicle arrives for service, identify service needs, order parts, and schedule services to remedy the identified service needs prior to physical access to the vehicle by a service technician. The apparatus, systems, techniques and articles described herein can allow for a more accurate collection of VSSI that may affect vehicle warranty claims and an OEM's cost structure. The apparatus, systems, techniques and articles described herein provide a multi-stage, multi-party content transmission protocol for authorized service facility usage. The apparatus, systems, techniques and articles described herein provide a multi-party security/privacy isolation protocol to protect a vehicle owner's security/privacy.

Figure 1:
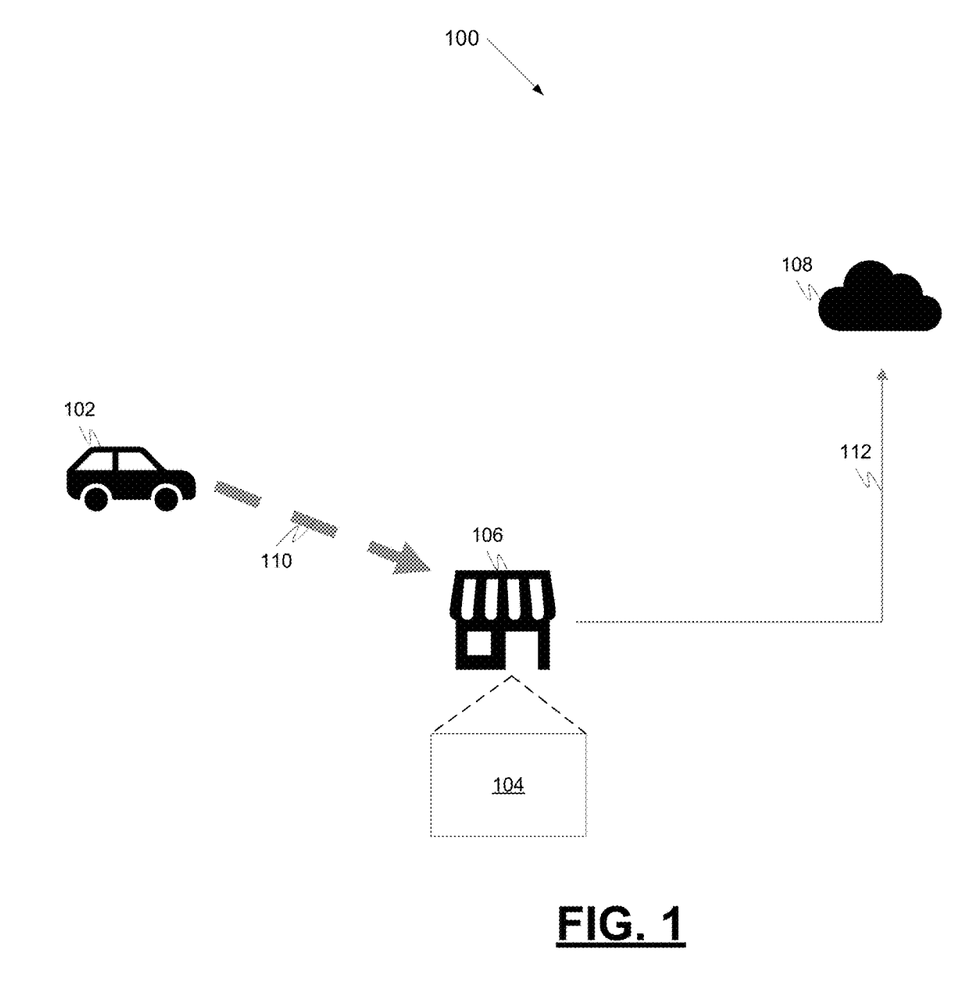
FIG. 1 is a diagram illustrating an example system for automatically uploading vehicle state and service information (VSSI) from a vehicle, using in-vehicle wi-fi, to a pre-service check-in system at an authorized service facility upon the arrival of the vehicle at the authorized service facility, in accordance with various embodiments.

FIG. 1 is a diagram illustrating an example system 100 for automatically uploading vehicle state and service information (VSSI) from a vehicle 102, using in-vehicle wi-fi, to a pre-service check-in system 104 at an authorized service facility 106 upon the arrival of the vehicle 102 at the authorized service facility 106. When the vehicle 102 arrives at the authorized service facility 106 and the pre-service check-in system 104 is within the wi-fi range of an in-vehicle wi-fi system provided by the vehicle 102, the pre-service check-in system 104 can detect the arrival of the vehicle 102, initiate a secure wi-fi, point-to-point (P2P) connection 110 with the vehicle 102, and attempt to retrieve VSSI to identify vehicle service needs. After retrieving sufficient VSSI to identify vehicle service needs, the authorized service facility 106, either manually, via the pre-service check-in system 104, or via some other system can take a number of actions, such as schedule vehicle services, order parts, etc., based on service needs identified through the VSSI.

The authorized service facility may not directly obtain the VSSI that is sufficient to identify vehicle service needs from the vehicle, but instead may obtain the VSSI from a cloud-based server 108. For privacy and/or data security reasons it may not be advantageous for the authorized service facility 106 to have direct access to all of the VSSI from a vehicle 102. For privacy and/or security concerns, the VSSI may not be stored at the authorized service facility, but instead at the cloud-based server 108, such as one operated and/or controlled by an OEM (original equipment manufacturer), which can store VSSI for multiple vehicles. When the authorized service facility 106 needs some of the VSSI to identify service needs for a vehicle 102, the cloud-based server 108 can provide the needed VSSI upon authorization by the vehicle 102. The example cloud-based server 108 includes non-transient computer readable storage media for storing VSSI for the vehicle 102. The VSSI in the vehicle 102 will change at times, and the VSSI stored in the cloud-based system 108 at times will not be up to date and will need updating.

The example cloud-based server 108 can establish a communication link with both the vehicle 102 and the authorized service facility 106. The communication link with the vehicle 102 may be through a cellular connection. Using a cellular connection to pass VSSI from the vehicle 102 to the cloud-based server 108, however, can be costly. The communication link with the authorized service facility 106 may be through a backbone network 112. Using the backbone network 112 to pass VSSI from the vehicle to the cloud-based server 108 can be a more economical solution in terms of monetary costs and computing resource utilization.

Also, uploading the entire VSSI to the cloud-based server 108 each time there are changes in the VSSI can waste transmission and computing resources. To conserve resources, the complete VSSI is not uploaded to the cloud-based server 108 each time there is a change in the VSSI stored in the vehicle. Instead, only a subset of the VSSI to replace the non-current (i.e., stale) VSSI can be transmitted to the cloud-based server 108, and the subset of replacement VSSI may be transmitted when more economical communication links are available for the transmission, such as when the vehicle 102 enters an authorized service facility 106. When the vehicle 102 enters an authorized service facility 106, the cloud-based server 108 is notified, can perform a membership test on its stored VSSI using membership information from the vehicle 102 to determine the portion of the VSSI stored in the cloud-based server 108 that is stale, and request that the authorized service facility retrieve the current version of the stale VSSI from the vehicle 102 and send that portion to the cloud-based server 108 via the backbone network 112.

The cloud-based server 108 may use a lightweight data abstraction structure (e.g., a Hash-based Bloom Filter) to conduct an approximate membership test, to check if the different VSSI items stored in the vehicle 102 are also stored in the cloud database before uploading VSSI. A Bloom Filter (BF) is a randomized data abstraction structure for concisely representing a set of interested items. It maps a set S={x_1, x_2, . . . , x_n} of n elements to a m-bit array (initially all set to zero), via k independent hash functions {h_1,h_2, . . . , h_k}.

Figure 2:
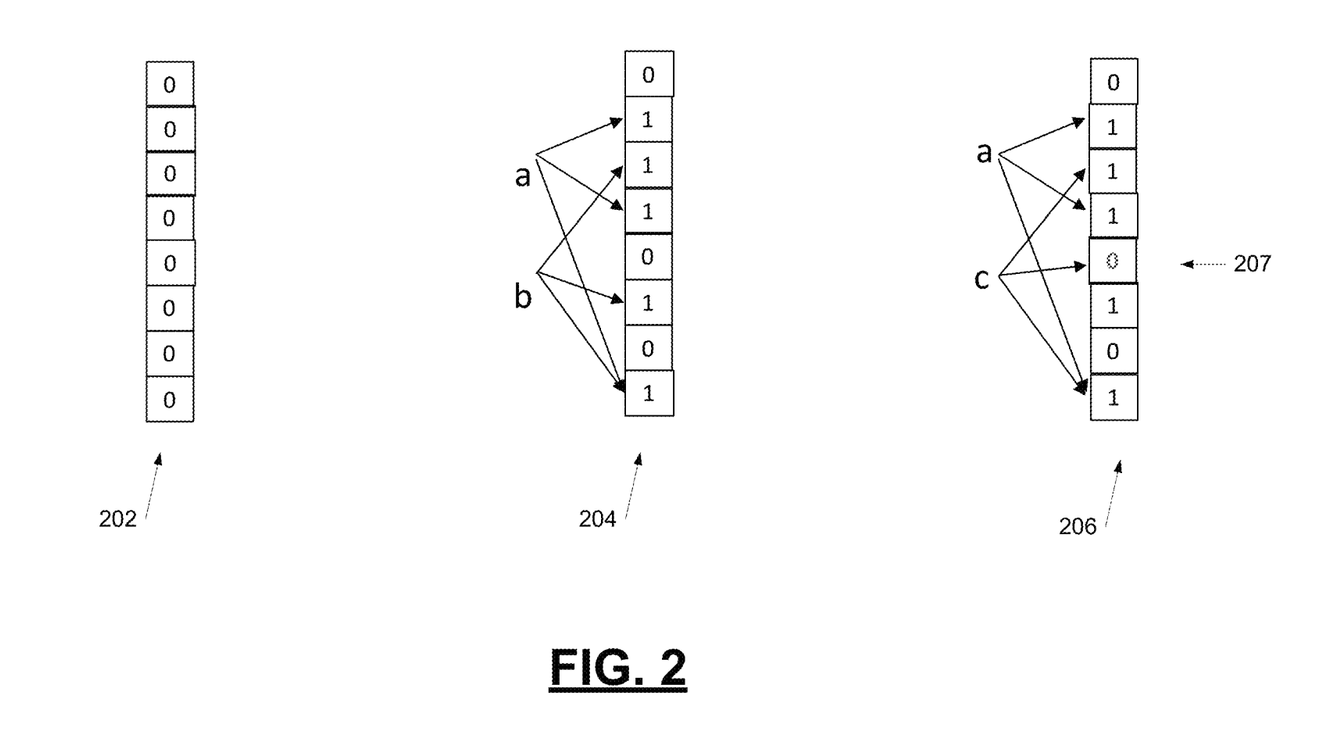
FIG. 2 is a diagram illustrating an example use of a Bloom Filter (BF) for membership testing, in accordance with various embodiments.

FIG. 2 is a diagram illustrating an example use of a Bloom Filter (BF) for membership testing. A controller in the vehicle 102 maps a set of n elements (e.g., a or b) in the VSSI to an original BF bit vector 202, by setting the position {h_1 (a),h_2 (a), . . . , h_k (a)} to value=1, via the k independent hash functions. Once a bit is changed to value=1, it always stays at value=1. The mapped BF bit vector 204 is transmitted to the cloud-based server for use in performing membership testing.

The cloud-based server 108 can perform a membership test by using the same k independent hash functions used in the vehicle 102 to map a set of n elements in the VSSI stored at the cloud-based server to an m-bit array 206. To determine if an unknown item c in the VSSI stored in the cloud-based server matches the equivalent item in the VSSI stored in the vehicle, the cloud-based server 108 compares the cloud-based server generated BF bit vector 206 with the vehicle generated BF bit vector 204. If there is an inconsistency (e.g., value=0 (at 207) in its footprint of item c), then item c does not belong to original set S and the portion of the VSSI represented by item c is stale and needs to be replaced.

Figure 3:
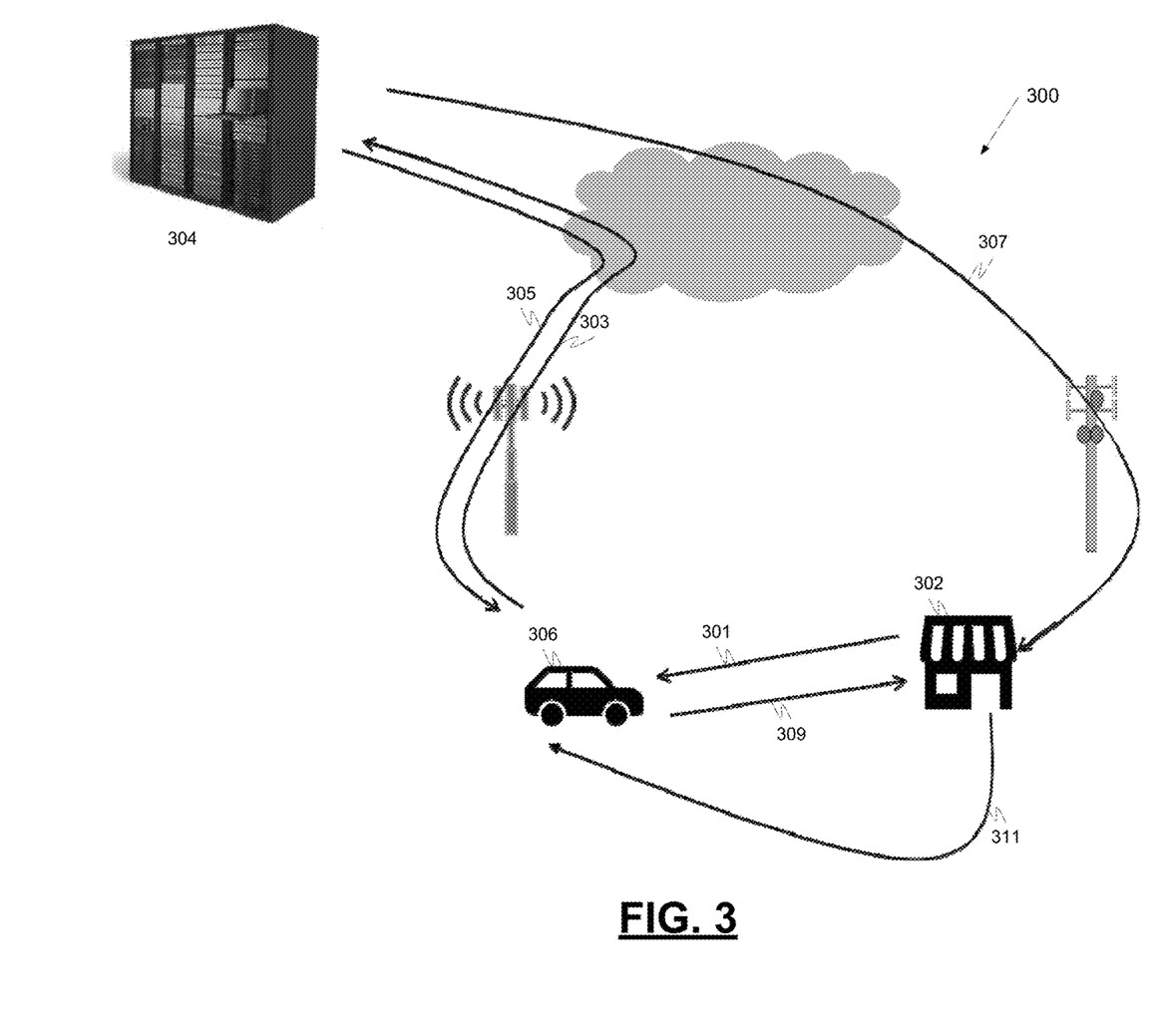
FIG. 3 is a flow diagram depicting example communications between a service facility, cloud-based server, and vehicle to establish a secure connection link for secure communications between the service facility and the vehicle, in accordance with various embodiments.

FIG. 3 is a flow diagram depicting example communications 300 between a service facility 302, cloud-based server 304, and vehicle 306 to establish a secure connection link for secure communications between the service facility 302 and the vehicle 306. The order of communications 300 is not limited to the sequential execution as illustrated in the figure, but may be performed in one or more varying orders as applicable and in accordance with the present disclosure. For privacy and security concerns, a secure connection methodology may be used for communication between the vehicle 306 and the service facility 302.

When the arrival of a vehicle 306 is detected at the service facility 302, the service facility 302 sends a pairing request 301 to the vehicle 306 via an in-vehicle wi-fi network. The pairing request 301 may include an address or other identifier for the service facility 302.

The vehicle 306 then sends a verification request 303 to the cloud-based server 304 for the cloud-based server 304 to verify the authenticity of the service facility 302. The verification request is sent via a cellular network. The verification request 303 includes the service facility identifier and an identifier for the vehicle 306.

The cloud-based server 304 retrieves the service facility identifier and the vehicle identifier from the verification request 303. When the cloud-based server 304 verifies the authenticity of the service facility 302, the cloud-based server 304 generates a session key, retrieves a private key for the vehicle 306 and retrieves a private key for the service facility 302. The cloud-based server 304 sends a first message 305 to the vehicle 306 via the cellular network and a second message 307 to the service facility 302 via a backbone network. The first message 305 includes the private key for the service facility 302 and the session key. The second message 307 includes the private key for the vehicle 306 and the session key.

The vehicle 306 retrieves the private key for the service facility 302 and the session key from the first message 305. The vehicle 306 generates a secrecy challenge message 309. The secrecy challenge message 309 includes the session key and a code word, such as a random number, that is encrypted using the private key for the service facility 302, which was received from the cloud-based server 304. The secrecy challenge message 309 is transmitted from the vehicle 306 to the service facility 302 via the wi-fi connection.

The service facility retrieves the private key for the vehicle 306 and the session key from the second message 307. Responsive to receipt of the secrecy challenge message 309, the service facility 302 decrypts the code word using the service facility's private key, encrypts the code word using the private key for the vehicle 306, which was received from the cloud-based server 304, and generates a response message 311 that includes the code word that has been encrypted using the private key for the vehicle 306. The service facility 302 transmits the response message 311 to the vehicle using the in-vehicle wi-fi network.

Upon receipt of the response message 311, the vehicle decrypts the code word and compares the decrypted code word with the original code word. If the decrypted code word matches the original code word, then a secure communication link is established and the service facility and the vehicle may communicate with each other in a secure manner.

The service facility 302 includes a computerized system comprising one or more processors and storage media. The one or more processors are programmed by programming instructions on non-transient computer readable media to perform the operations for establishing the secure communication link. These operations include: detecting the arrival of a vehicle at the service facility 302, generating a pairing request message 301 that includes an identifier for the service facility 302, sending the pairing request 301 to the vehicle 306 via an in-vehicle wi-fi network, retrieving a private key from the second message 307 received from the cloud-based server via a backbone network, decrypting using the private key of the service facility the code word from the secrecy challenge message 309 received from the vehicle via the in-vehicle wi-fi network, encrypting the code word using the private key retrieved from the second message 307, sending the encrypted code word to the vehicle 306 in a response message 311 via the in-vehicle wi-fi network, and any other operation necessary for performing the communications 300 identified in the flow diagram.

The vehicle 306 includes a controller configured by programming instructions on non-transient computer readable media to perform operations for establishing the secure communication link. These operations include: providing an in-vehicle wi-fi network, recognizing a pairing request message 301 received over the wi-fi network from the service facility 302, retrieving the identifier for the service facility from the pairing request message 301, generating a verification request message 303 that includes the identifier for the service facility, sending the verification request message 303 to the cloud-based server 304 via the cellular network, retrieving the private key for the service facility 302 from the first message 305 received from the cloud-based server 304 via the cellular network, generating a code word, encrypting the code word using the private key retrieved from the first message, sending the encrypted code word to the service facility 302 via the in-vehicle wi-fi network in a secrecy challenge message 309, retrieving an encrypted code word from the response message 311 received via the in-vehicle wi-fi network, decrypting the encrypted code word using the secret key of the vehicle, comparing the decrypted code word with the original code word, establishing the secure communication link when the decrypted code word matches the original code word, and any other operation necessary for performing the communications 300 identified in the flow diagram.

The cloud-based server 304 includes a computerized system comprising one or more processors and storage media. The one or more processors are programmed by programming instructions on non-transient computer readable media to perform the operations for establishing the secure communication link. These operations include: retrieving the service facility identifier and the vehicle identifier from the verification request message 303, verifying the authenticity of the service facility 302, generating a session key, retrieving a private key for the vehicle 306 and a private key for the service facility 304 key when the cloud-based server 304 verifies the authenticity of the service facility 302, generating and sending a first message 305 to the vehicle 306 via the cellular network and a second message 307 to the service facility 302 via a backbone network wherein the first message 305 includes the private key for the service facility 302 and the session key and the second message 307 includes the private key for the vehicle 306 and the session key, and any other operation necessary for performing the communications 300 identified in the flow diagram.

Figure 4:
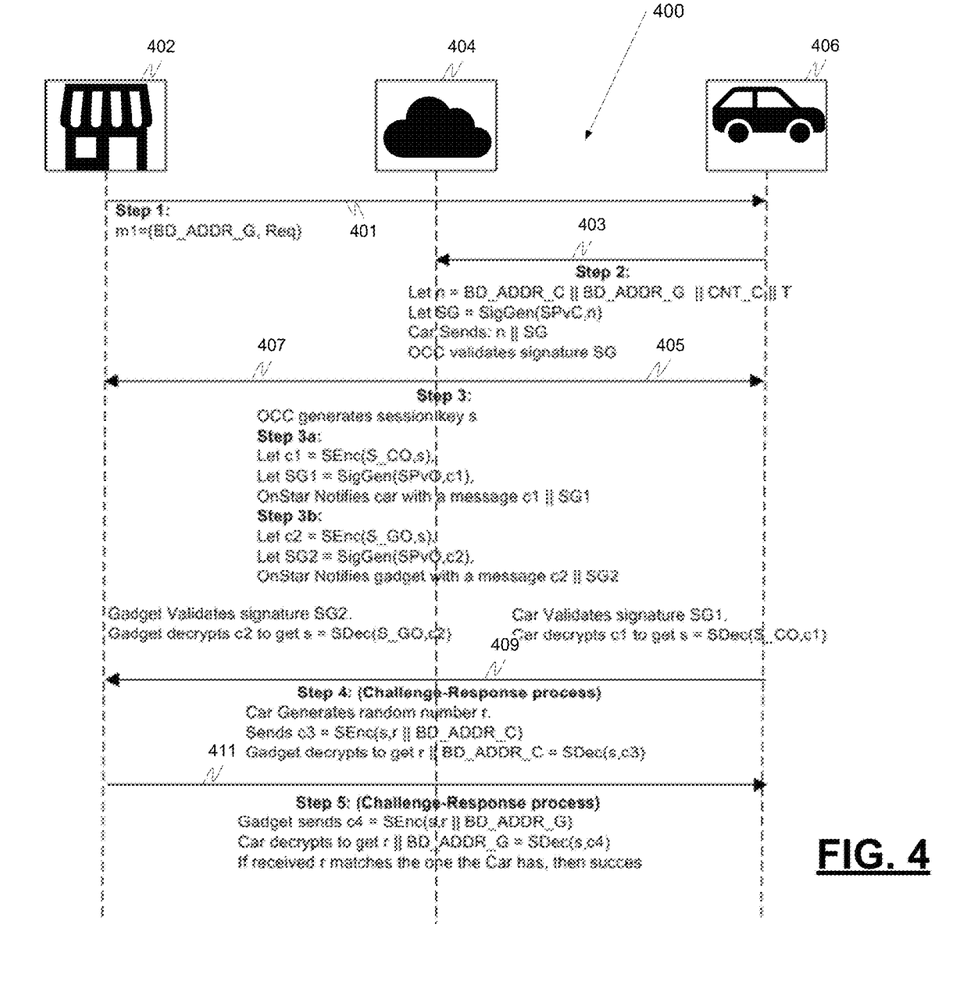
FIG. 4 is a sequence diagram depicting example communications between an authorized service facility, cloud-based server, and vehicle to establish a secure connection link for secure communications between the service facility and the vehicle, in accordance with various embodiments.

FIG. 4 is a sequence diagram depicting example communications 400 between an authorized service facility 402, cloud-based server 404, and vehicle 406 to establish a secure connection link for secure communications between the service facility 402 and the vehicle 406. The order of communications 400 is not limited to the sequential execution as illustrated in the figure, but may be performed in one or more varying orders as applicable and in accordance with the present disclosure.

When the arrival of a vehicle 406 is detected at the service facility 402, the service facility 402 sends a pairing request 401 to the vehicle 406. The pairing request 401 may include an address or other identifier for the service facility 402.

The vehicle 406 then sends a verification request 403 to the cloud-based server 404 for the cloud-based server 404 to verify the authenticity of the service facility 402. The verification request 403 includes the service facility identifier and an identifier for the vehicle 406.

The cloud-based server 404 retrieves the service facility identifier and the vehicle identifier from the verification request 403. When the cloud-based server 304 verifies the authenticity of the service facility 402, the cloud-based server 404 generates a session key, retrieves a private key for the vehicle 406 and retrieved a private key for the service facility 404. The cloud-based server 404 sends a first message 405 to the vehicle 406 and a second message 407 to the service facility 402. The first message 405 includes the private key for the service facility 402 and the session key. The second message 407 includes the private key for the vehicle 406 and the session key.

The vehicle 406 retrieves the private key for the service facility 402 and the session key from the first message 405. The vehicle 406 generates a secrecy challenge message 409. The secrecy challenge message 409 includes the session key and a code word, such as a random number, that is encrypted using the private key for the service facility 402, which was received from the cloud-based server 404. The secrecy challenge message 409 is transmitted from the vehicle 306 to the service facility 402.

The service facility retrieves the private key for the vehicle 406 and the session key from the second message 407. Responsive to receipt of the secrecy challenge message 409, the service facility 402 decrypts the code word using its private key, encrypts the code word using the private key for the vehicle 406, which was received from the cloud-based server 404, and generates a response message 411 that includes the code word that has been encrypted using the private key for the vehicle 406. The service facility 402 transmits the response message 411 to the vehicle.

Upon receipt of the response message 411, the vehicle decrypts the code word and compares the decrypted code word with the original code word. If the decrypted code word matches the original code word, then a secure communication link is established and the service facility and the vehicle may communicate with each other in a secure manner.

Figure 5A:
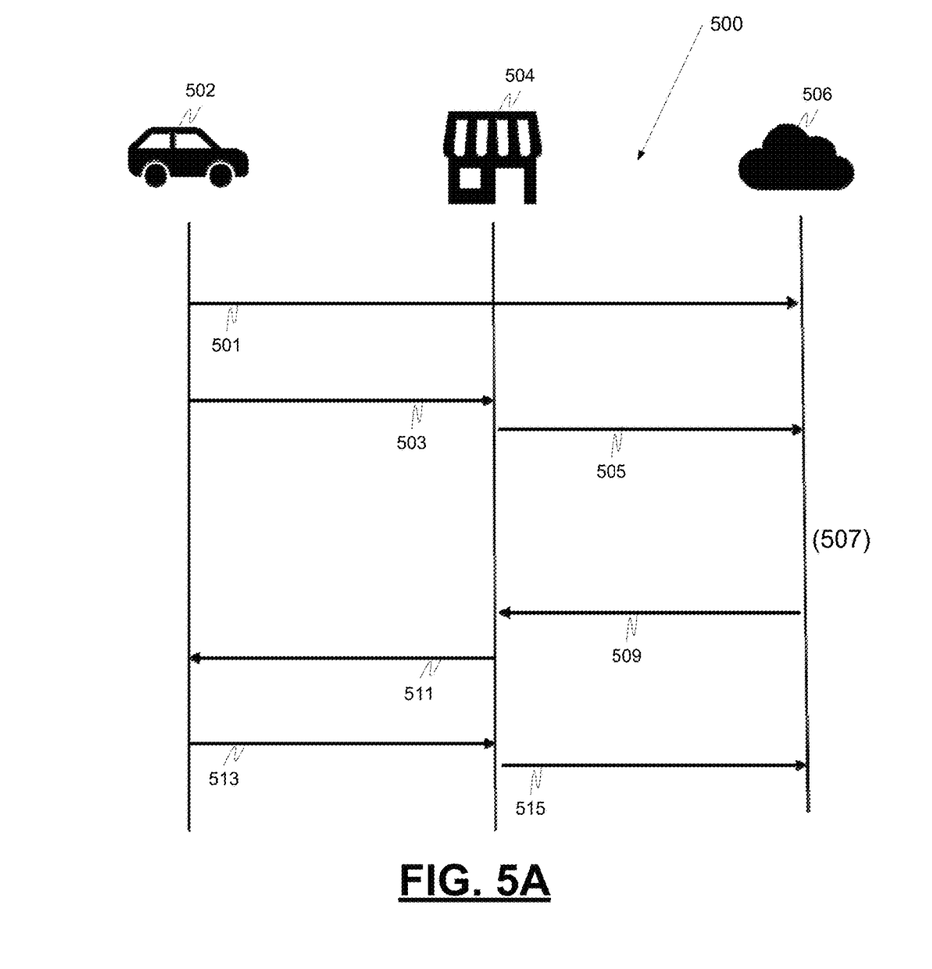
FIG. 5A is a sequence diagram depicting example communications between a vehicle, an authorized service facility, and a cloud-based server to update the VSSI for the vehicle stored in a VSSI database in the cloud-based server, in accordance with various embodiments.
Figure 5B:
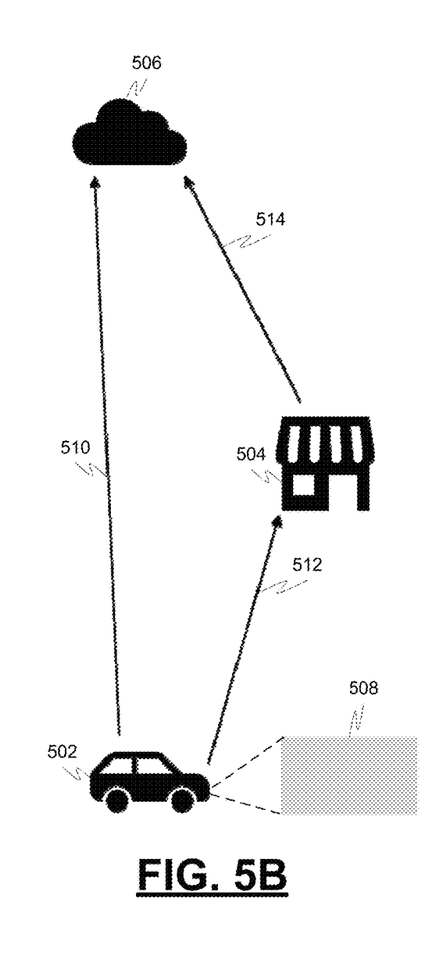
FIG. 5B is a block diagram depicting example communication links between the vehicle, the authorized service facility, and the cloud-based server, in accordance with various embodiments.

FIG. 5A is a sequence diagram depicting example communications 500 between a vehicle 502, an authorized service facility 504, and a cloud-based server 506 to update the VSSI for the vehicle stored in a VSSI database in the cloud-based server. FIG. 5B is a block diagram depicting example communication links between the vehicle 502, the authorized service facility 504, and the cloud-based server 506. FIG. 5B illustrates that communications between the vehicle 502 and the authorized service facility 504 are via a cellular link 510, communications between the vehicle 502 and the authorized service facility 504 are via a wi-fi network 512, and communications between the service facility 504 and cloud-based server 506 are via a backbone network 514. FIG. 5B also illustrates that the example vehicle 502 includes a vehicular NAM module 508 comprising one or more processors configured by programming instructions on non-transient computer readable media. The example NAM module 508 is configured to perform the operations necessary for vehicle communications identified in FIG. 5A.

With reference to FIG. 5A, after a secure connection link for secure communications between the vehicle 502 and the service facility 504 has been established, the vehicle 502 transmits, in a first message 501, the hash functions and Bloom Filter (BF) parameters applied by the vehicle 502 on its internally stored VSSI to the cloud-based server 506. The vehicle 502 also transmits, in a second message 503, its BF bit array for its internally stored VSSI to the service facility 504. The vehicle transmits its more sensitive and lower volume hash functions and Bloom Filter (BF) parameters to the cloud-based server via the more costly but more private cellular network and transmits its more voluminous BF bit array to the cloud-based server via the less costly wi-fi and backbone networks.

The service facility 504 forwards the second message 503 which includes the vehicle's BF bit array for its internally stored VSSI in a third message 505 to the cloud-based server. The cloud-based server 506, after receipt of the first message 501 containing the hash functions and Bloom Filter (BF) parameters applied by the vehicle 502 and the third message 505 containing the BF bit array generated by the vehicle 502 can conduct a membership test (operation 507) regarding the cloud stored VSSI. Based on the membership test results, the cloud-based server 506 can generate and send a VSSI request 509 to the service facility 504 that requests the portion of the VSSI that failed the membership test. The service facility 504 then sends a VSSI request 511 to the vehicle 502 that requests the portion of the VSSI that failed the membership test.

Responsive to receipt of the VSSI request 511, the vehicle 502 can send the requested VSSI in a VSSI data packet 513 to the service facility 504. The service facility 504 can send the requested VSSI in a VSSI data packet 515 to the cloud-based server 506.

The cloud-based server 506 includes a computerized system comprising one or more processors and storage media. The one or more processors are programmed by programming instructions on non-transient computer readable media to perform the operations for updating the VSSI stored in the cloud. These operations include: retrieving from the first message 501 the hash functions and Bloom Filter (BF) parameters applied by the vehicle 502 on its internally stored VSSI, retrieving from the third message 505 the vehicle's BF bit array for its internally stored VSSI, conducting a membership test (operation 507) regarding the cloud stored VSSI wherein the membership test may include comparing the vehicle's BF bit array with a cloud-based server generated BF bit array that was generating using the same hash functions and Bloom Filter (BF) parameters applied by the vehicle 502, generating and sending based on the membership test results a VSSI request 509 to the service facility 504 that requests the portion of the VSSI that failed the membership test, updating the cloud stored VSSI with VSSI data packet 515 received from the service facility in response to the VSSI request 509, and any other operation necessary for performing the communications 500 identified in the flow diagram.

The service facility 504 includes a computerized system comprising one or more processors and storage media. The one or more processors are programmed by programming instructions on non-transient computer readable media to perform the operations for updating the VSSI stored in the cloud. These operations include: forwarding the second message 503 which includes the vehicle's BF bit array for its internally stored VSSI in a third message 505 to the cloud-based server, forwarding a VSSI request message 509 received from the cloud-based server 506 in a VSSI request message 511 to the vehicle 502 wherein the VSSI request message 511 requests the portion of the VSSI that failed the membership test, forwarding requested VSSI received from the vehicle 502 via a VSSI data packet 513 in a VSSI data packet 515 to the cloud-based server 506, and any other operation necessary for performing the communications 500 identified in the flow diagram.

The vehicle 502 includes a vehicular NAM module 508 implemented by a controller that is configured by programming instructions in non-transient computer readable media. The NAM module 508 is configured to perform the operations for updating the VSSI stored in the cloud. The operations include: transmitting in a first message 501 the hash functions and Bloom Filter (BF) parameters applied by the vehicle 502 on its internally stored VSSI to the cloud-based server 506 after a secure connection link for secure communications between the vehicle 502 and the service facility 504 has been established, transmitting to the service facility 504 in a second message 503 its BF bit array for its internally stored VSSI to the service facility 504 wherein the vehicle transmits its more sensitive and lower volume hash functions and Bloom Filter (BF) parameters to the cloud-based server via the more costly but more private cellular network and transmits its more sensitive and lower volume hash functions and Bloom Filter (BF) parameters to the cloud-based server via the more costly but more private cellular network, transmitting requested VSSI in a VSSI data packet 513 to the service facility 504 responsive to receipt of the VSSI request 511, and any other operation necessary for performing the communications 500 identified in the flow diagram.

Figure 6:
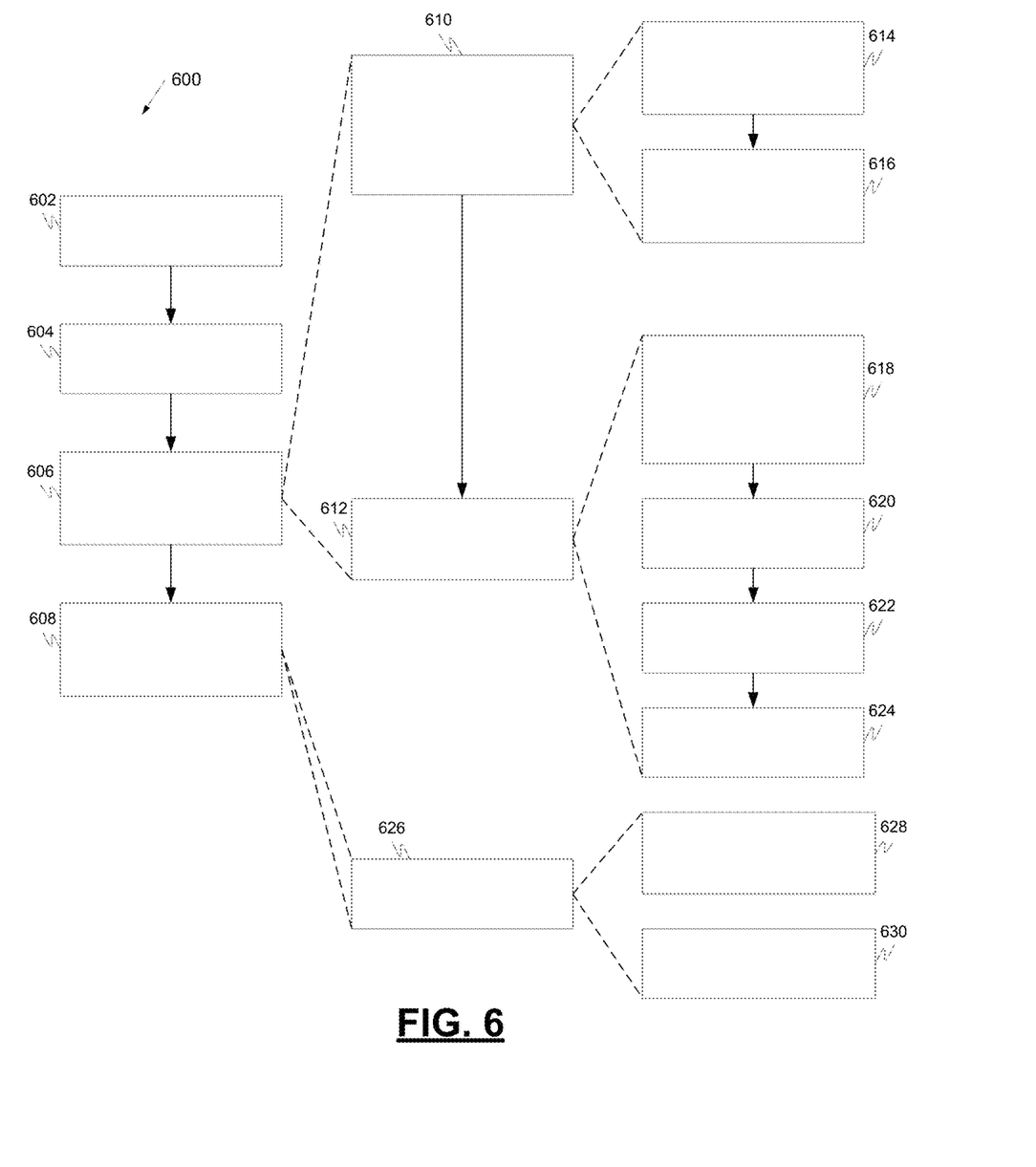
FIG. 6 is a process flow chart depicting an example process at a service facility when a vehicle arrives, in accordance with various embodiments.

FIG. 6 is a process flow chart depicting an example process 600 at a service facility when a vehicle arrives. The order of operation within process 600 is not limited to the sequential execution as illustrated in the figure, but may be performed in one or more varying orders as applicable and in accordance with the present disclosure. The example process includes detecting that a vehicle has arrived at the service facility (operation 602), establishing a secured communication link with the vehicle (operation 604), retrieving VSSI to identify vehicle service needs without physically connecting with the vehicle (operation 606), and scheduling vehicle services based on service needs identified from the VSSI (operation 608).

The detecting that a vehicle has arrived at the service facility may include automatically sensing that a new in-vehicle wi-fi network is available, for example, by a processor-implemented system comprising one or more processors configured by programming instructions on computer readable media. The detecting may be performed automatically by other mechanisms. The establishing a secure communication link with the vehicle may be performed using the example communications 300 or example communications 400.

The retrieving VSSI data to identify vehicle service needs without physically connecting with the vehicle may include retrieving data for determining a subset of VSSI needed to update cloud stored VSSI (operation 610) and retrieving a subset of VSSI needed to update cloud stored VSSI (operation 612). Retrieving data for determining the subset of VSSI needed to update cloud stored VSSI may include receiving from the vehicle results from the application of the BF to vehicle VSSI (operation 614) and sending the BF results to the cloud-based server for performance of a membership test (operation 616). Retrieving the subset of VSSI needed to update the cloud stored VSSI may include receiving from the cloud-based server a request for a subset of VSSI that failed the membership test (operation 618), sending a request for the subset of VSSI that failed the membership test to the vehicle (operation 620), receiving the requested subset of VSSI from the vehicle (operation 622), and transmitting the requested subset of VSSI to the cloud-based server (operation 624).

The scheduling vehicle services based on service needs identified from the VSSI may include diagnosing vehicle service needs (operation 626). Diagnosing vehicle service needs may include receiving from the cloud-based server an indication of vehicle service needs based on an analysis of the VSSI (operation 628) and/or receiving, from the cloud-based server, VSSI for diagnosing service needs (operation 630).

Figure 7:
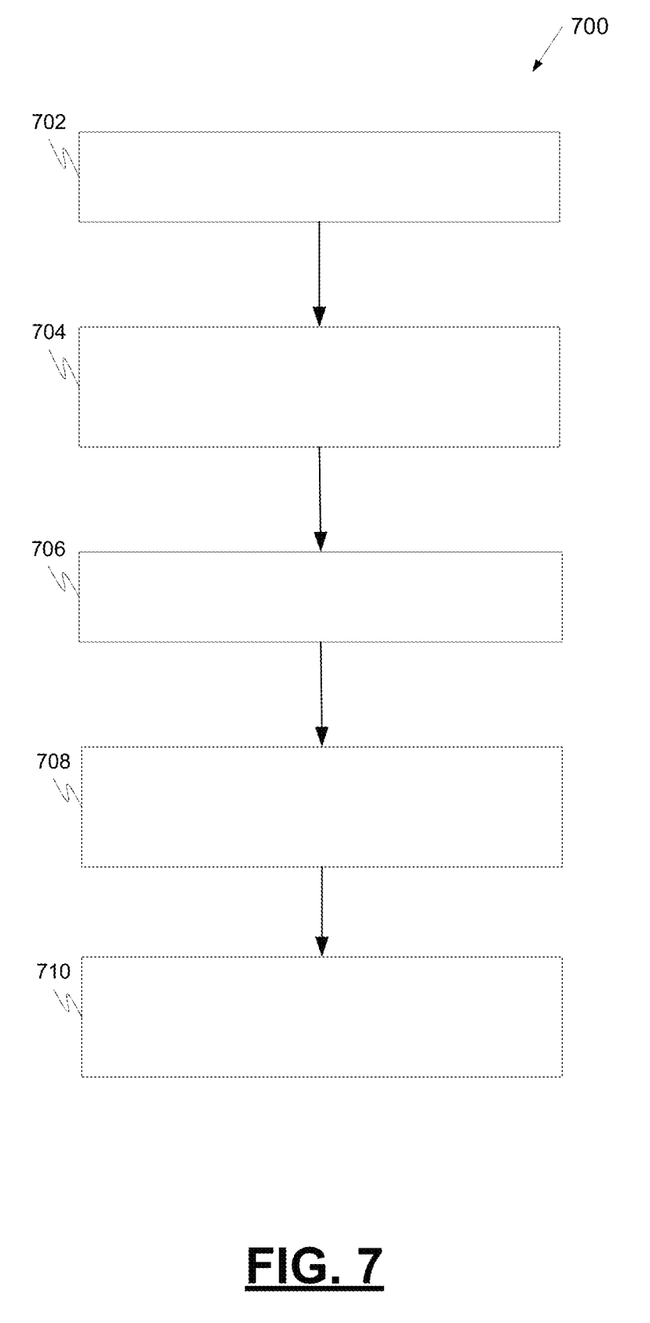
FIG. 7 is a process flow chart depicting an example process in a vehicle for transmitting VSSI, in accordance with various embodiments.

FIG. 7 is a process flow chart depicting an example process 700 in a vehicle for transmitting VSSI. The order of operation within process 700 is not limited to the sequential execution as illustrated in the figure, but may be performed in one or more varying orders as applicable and in accordance with the present disclosure. The example process includes arriving at a service facility (operation 702), establishing secure communications with the service facility (operation 704) responsive to a request by the service facility, transmitting Bloom filter metadata to a cloud-based server (operation 706), transmitting BF data to the service facility (operation 708), and securely transmitting a subset of the VSSI to the service facility responsive to a request from the service facility (operation 710), wherein one or more services are scheduled based on an analysis of the VSSI without the service facility physically connecting to vehicle connectors to physically extract VSSI from the vehicle. The establishing secure communications with the service facility may be performed using the communications 300 or communications 400. The Bloom filter metadata transmitted to a cloud-based server may include the identity of hash functions used and Bloom filter parameters. The one or more services may be scheduled prior to user request for the service.

Figure 8:
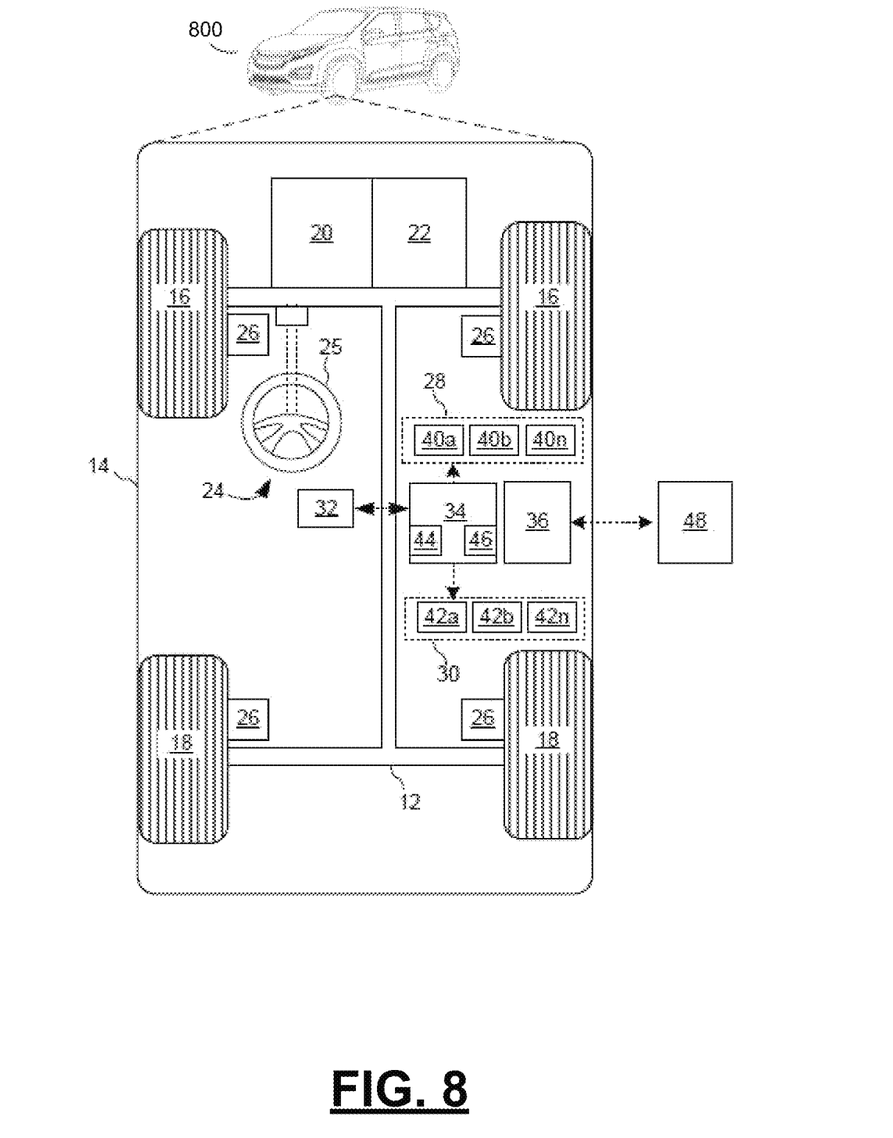
FIG. 8 depicts an example vehicle that may be configured to communicate with a service facility and cloud-based server to provide VSSI, in accordance with various embodiments.

FIG. 8 depicts an example vehicle 800 that may be configured to communicate with a service facility and cloud-based server to provide VSSI. The vehicle 800 is depicted in the illustrated embodiment as a passenger car, but other vehicle types, including motorcycles, trucks, sport utility vehicles (SUVs), recreational vehicles (RVs), marine vessels, aircraft, etc., may also be used.

The example vehicle 800 generally includes a chassis 12, a body 14, front wheels 16, and rear wheels 18. The body 14 is arranged on the chassis 12 and substantially encloses components of the vehicle 800. The body 14 and the chassis 12 may jointly form a frame. The wheels 16-18 are each rotationally coupled to the chassis 12 near a respective corner of the body 14. The example vehicle 800 further includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. The brake system 26 is configured to provide braking torque to the vehicle wheels 16 and 18. The steering system 24 influences a position of the vehicle wheels 16 and/or 18. The sensor system 28 includes one or more sensing devices 40a-40n that sense observable conditions of the exterior environment and/or the interior environment of the vehicle 800 and generate sensor data relating thereto. The actuator system 30 includes one or more actuator devices 42a-42n that control one or more vehicle features such as, but not limited to, the propulsion system 20, the transmission system 22, the steering system 24, and the brake system 26. The data storage device 32 stores data for use in automatically controlling the vehicle 800. The data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 800. The instructions may include one or more separate programs, each of which comprises an ordered listing of executable instructions for implementing logical functions.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method at a service facility for capturing vehicle state and service information (VSSI), the method comprising:
   detecting an arrival of a vehicle at the service facility;
   initiating, by a processor at the service facility, the establishment of a secure communication link with the vehicle via an in-vehicle wi-fi hotspot, the initiating comprising:
      wirelessly transmitting a pairing request to the vehicle;
      receiving a vehicle private key from a cloud-based server;
      receiving an encrypted code word from the vehicle;
      decrypting the code word;
      re-encrypting the decrypted code word using the vehicle private key; and
      transmitting the re-encrypted code word to the vehicle;
      wherein the secure communication link is established after the vehicle decrypts the re-encrypted code word and verifies that the decrypted re-encrypted code word is the same as the code word that was encrypted by the vehicle;
   wirelessly retrieving, by the processor at the service facility from the vehicle, a subset of VSSI via the wi-fi hotspot, wherein the retrieved VSSI comprises the subset of the VSSI that has changed since the last update of the VSSI to the cloud-based server and wherein the subset of the VSSI includes some, but not all of the VSSI; and
   scheduling a vehicle service based on service indications derived from the VSSI.

2. The method of claim 1, wherein:
   the receiving a vehicle private key from a cloud-based server comprises receiving a first message from the cloud-based server containing a vehicle private key via a backbone network;
   the receiving an encrypted code word from the vehicle comprises receiving a second message from the vehicle containing a code word that has been encrypted by the vehicle using a service facility private key;
   the decrypting the code word comprises decrypting the code word using the service facility private key; and
   the secure communication link is established after the vehicle decrypts the re-encrypted code word and verifies that the decrypted re-encrypted code word is the same as the code word that was encrypted by the vehicle and received by the service facility in the second message.

3. The method of claim 1, wherein the wirelessly retrieving the subset of the VSSI comprises:
   retrieving, from the vehicle, data for determining the subset of the VSSI that has changed since the last update of the VSSI to the cloud-based server.

4. The method of claim 3, wherein the retrieving data for determining the subset of the VSSI that has changed since the last update of the VSSI to the cloud-based server comprises:
   receiving from the vehicle the results from applying a hash function to the VSSI; and
   sending the hash function results to the cloud-based server for use in performing a membership test.

5. The method of claim 4, wherein:
   the applying a hash function to the VSSI comprises applying a bloom filter to the VSSI; and
   the sending the hash function results to the cloud-based server comprises sending the bloom filter results to the cloud-based server for use in performing a membership test.

6. The method of claim 4, wherein the wirelessly retrieving the subset of the VSSI further comprises:
   receiving, from the cloud-based server, a request for a subset of the VSSI that failed a membership test performed by the cloud-based server on cloud-based server stored VSSI;
   requesting, from the vehicle, the subset of the VSSI that failed the membership test;
   receiving, from the vehicle, the subset of the VSSI that failed the membership test; and
   sending the received subset of the VSSI that failed the membership test to the cloud-based server.

7. The method of claim 1, wherein the scheduling a vehicle service based on service indications derived from the VSSI comprises identifying automotive service needs from the VSSI.

8. The method of claim 7, wherein the identifying automotive service needs from the VSSI comprises:
   receiving, from the cloud-based server, service indications determined by cloud-based server analysis of the VSSI; or
   receiving, from the cloud-based server, VSSI for analysis by the service facility to determine maintenance indications.

9. A computer-implemented system at a service facility for capturing vehicle state and service information (VSSI), the system comprising a controller configured to:
   detect an arrival of a vehicle at the service facility;
   initiate the establishment of a secure communication link with the vehicle via an in-vehicle wi-fi hotspot, to initiate the controller is configured to:
      wirelessly transmit a pairing request to the vehicle;
      receive a vehicle private key from a cloud-based server;
      receive an encrypted code word from the vehicle;
      decrypt the code word;
      re-encrypt the decrypted code word using the vehicle private key; and
      transmit the re-encrypted code word to the vehicle;

wherein the secure communication link is established after the vehicle decrypts the re-encrypted code word and verifies that the decrypted re-encrypted code word is the same as the code word that was encrypted by the vehicle;

wirelessly retrieve from the vehicle a subset of VSSI via the wi-fi hotspot, wherein the retrieved VSSI comprises the subset of the VSSI that has changed since the last update of the VSSI to the cloud-based server and wherein the subset of the VSSI includes some, but not all of the VSSI; and schedule a vehicle service based on service indications derived from the VSSI.

10. The system of claim 9, wherein:

to receive a vehicle private key from a cloud-based server the controller is configured to receive a first message from the cloud-based server containing a vehicle private key via a backbone network;

to receive an encrypted code word from the vehicle the controller is configured to receive a second message from the vehicle containing a code word that has been encrypted by the vehicle using a service facility private key;

to decrypt the code word the controller is configured to decrypt the code word using the service facility private key; and the secure communication link is established after the vehicle decrypts the re-encrypted code word and verifies that the decrypted re-encrypted code word is the same as the code word that was encrypted by the vehicle and received by the service facility in the second message.

11. The system of claim 9, wherein to wirelessly retrieve the subset of the VSSI the controller is configured to:

retrieve, from the vehicle, data for determining the subset of the VSSI that has changed since the last update of the VSSI to the cloud-based server.

12. The system of claim 11, wherein to retrieve data for determining the subset of the VSSI that has changed since the last update of the VSSI to the cloud-based server the controller is configured to:

receive from the vehicle the results from applying a hash function to the VSSI; and send the hash function results to the cloud-based server for use in performing a membership test.

13. The system of claim 12, wherein:

to apply a hash function to the VSSI the controller is configured to apply a bloom filter to the VSSI; and to send the hash function results to the cloud-based server the controller is configured to send the bloom filter results to the cloud-based server for use in performing a membership test.

14. The system of claim 12, wherein to wirelessly retrieve the subset of the VSSI the controller is configured to:

receive, from the cloud-based server, a request for a subset of the VSSI that failed a membership test performed by the cloud-based server on cloud-based server stored VSSI;

request, from the vehicle, the subset of the VSSI that failed the membership test;

receive, from the vehicle, the subset of the VSSI that failed the membership test; and send the received subset of the VSSI that failed the membership test to the cloud-based server.

15. The system of claim 9, wherein to schedule a vehicle service based on service indications derived from the VSSI the controller is configured to identify automotive service needs from the VSSI.

16. The system of claim 15, wherein to identify automotive service needs from the VSSI the controller is configured to:

receive, from the cloud-based server, service indications determined by cloud-based server analysis of the VSSI; or receive, from the cloud-based server, VSSI for analysis by the service facility to determine maintenance indications.

17. Non-transitory computer readable media encoded with programming instructions configurable to cause one or more processors at a service facility to perform a method for capturing vehicle state and service information (VSSI), the method comprising:

detecting an arrival of a vehicle at the service facility;

initiating the establishment of a secure communication link with the vehicle via an in-vehicle wi-fi hotspot, the initiating comprising:

wirelessly transmitting a pairing request to the vehicle;

receiving a vehicle private key from a cloud-based server;

receiving an encrypted code word from the vehicle;

decrypting the code word;

re-encrypting the decrypted code word using the vehicle private key; and transmitting the re-encrypted code word to the vehicle;

wherein the secure communication link is established after the vehicle decrypts the re-encrypted code word and verifies that the decrypted re-encrypted code word is the same as the code word that was encrypted by the vehicle;

wirelessly retrieving a subset of VSSI via the wi-fi hotspot, wherein the retrieved VSSI comprises the subset of the VSSI that has changed since the last update of the VSSI to the cloud-based server and wherein the subset of the VSSI includes some, but not all of the VSSI; and scheduling a vehicle service based on service indications derived from the VSSI.

18. The non-transitory computer readable media of claim 17, wherein:

the receiving a vehicle private key from a cloud-based server comprises receiving a first message from the cloud-based server containing a vehicle private key via a backbone network;

the receiving an encrypted code word from the vehicle comprises receiving a second message from the vehicle containing a code word that has been encrypted by the vehicle using a service facility private key;

the decrypting the code word comprises decrypting the code word using the service facility private key; and the secure communication link is established after the vehicle decrypts the re-encrypted code word and verifies that the decrypted re-encrypted code word is the same as the code word that was encrypted by the vehicle and received by the service facility in the second message.

19. The non-transitory computer readable media of claim 17, wherein the wirelessly retrieving the subset of the VSSI comprises:

retrieving, from the vehicle, data for determining the subset of the VSSI that has changed since the last update of the VSSI to the cloud-based server.

20. The non-transitory computer readable media of claim 19, wherein the retrieving data for determining the subset of the VSSI that has changed since the last update of the VSSI to the cloud-based server comprises:
  receiving from the vehicle the results from applying a hash function to the VSSI; and
  sending the hash function results to the cloud-based server for use in performing a membership test.

\* \* \* \* \*